United States Patent
Schmidt

(10) Patent No.: US 10,355,265 B2
(45) Date of Patent: Jul. 16, 2019

(54) ELECTRIC ENERGY STORAGE CELL, ELECTRIC ENERGY STORAGE DEVICE AND MOTOR VEHICLE

(71) Applicant: AUDI AG, Ingolstadt (DE)

(72) Inventor: Jörg Schmidt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 11 days.

(21) Appl. No.: 15/535,493

(22) PCT Filed: Dec. 10, 2015

(86) PCT No.: PCT/EP2015/079215
§ 371 (c)(1),
(2) Date: Jun. 13, 2017

(87) PCT Pub. No.: WO2016/092001
PCT Pub. Date: Jun. 16, 2016

(65) Prior Publication Data
US 2017/0352862 A1    Dec. 7, 2017

(30) Foreign Application Priority Data

Dec. 13, 2014 (DE) .................. 10 2014 018 638

(51) Int. Cl.
*H01M 2/26* (2006.01)
*H01M 2/34* (2006.01)
(Continued)

(52) U.S. Cl.
CPC ............. *H01M 2/348* (2013.01); *B60L 58/10* (2019.02); *H01M 2/26* (2013.01); *H01M 2/30* (2013.01); *H01M 2220/20* (2013.01)

(58) Field of Classification Search
CPC .......... H01M 2/348; H01M 2/26; H01M 2/30; H01M 2220/20; B60L 11/1851
See application file for complete search history.

(56) References Cited

U.S. PATENT DOCUMENTS

2006/0014924 A1* 1/2006 Hanley ................. C08G 59/24
528/407
2006/0040181 A1* 2/2006 Kim ........................ H01M 2/30
429/211
(Continued)

FOREIGN PATENT DOCUMENTS

CN       1786096 A    6/2006
CN     102863921 A    1/2013
(Continued)

OTHER PUBLICATIONS

English translation of the International Preliminary Report on Patentability dated Jun. 22, 2017 issued in corresponding International Application No. PCT/EP2015/079215; 7 pgs.
(Continued)

*Primary Examiner* — Lisa S Park
(74) *Attorney, Agent, or Firm* — Maier & Maier, PLLC

(57) ABSTRACT

An electric energy storage cell is provided with a plurality of cell layers. At least two cell layers are equipped with electrically conductive contact elements that are coupled with their electrodes and create at least one connection between the at least two cell layers by an adhesive site realized from a conductive adhesive on the contact elements. At least one connection realized by the adhesive site is interrupted when the adhesive-specific temperature limiting value is exceeded in the adhesive site.

10 Claims, 4 Drawing Sheets

(51) Int. Cl.
*H01M 2/30* (2006.01)
*B60L 58/10* (2019.01)

(56) References Cited

U.S. PATENT DOCUMENTS

| | | | |
|---|---|---|---|
| 2006/0118767 A1 | 6/2006 | Jang et al. | |
| 2009/0263707 A1* | 10/2009 | Buckley | H01M 2/1653 429/94 |
| 2012/0189881 A1* | 7/2012 | Geoffroy | H01M 2/22 429/61 |
| 2013/0009105 A1 | 1/2013 | Higuchi et al. | |
| 2013/0074330 A1* | 3/2013 | Tucholski | H01M 2/30 29/832 |
| 2014/0218163 A1* | 8/2014 | Zaffaroni | C08K 3/04 338/322 |
| 2014/0272547 A1 | 9/2014 | Ramasubramanian et al. | |
| 2015/0104681 A1* | 4/2015 | Wang | H01M 2/30 429/50 |

FOREIGN PATENT DOCUMENTS

| | | |
|---|---|---|
| CN | 103081178 A | 5/2013 |
| CN | 203277543 U | 11/2013 |
| DE | 102011110702 A1 | 2/2013 |
| DE | 102012213110 A1 | 1/2014 |
| DE | 102012015910 A1 | 2/2014 |
| DE | 10 2013 013 662 A1 | 2/2015 |
| WO | 2012/027835 A1 | 3/2012 |
| WO | 2013/112135 A1 | 8/2013 |

OTHER PUBLICATIONS

Examination Report dated Jul. 22, 2015 of corresponding German application No. 10 2014 018 638.5; 5 pgs.
International Search Report dated Mar. 1, 2016 of corresponding International application No. PCT/EP2015/079215; 13 pgs.
Chinese Office Action dated Apr. 10, 2019, in connection with corresponding CN Application No. 201580067600.2 (18 pgs., including English translation).

* cited by examiner

ELECTRIC ENERGY STORAGE CELL, ELECTRIC ENERGY STORAGE DEVICE AND MOTOR VEHICLE

FIELD

The invention relates to an electric energy storage cell that is provided with several cell layers, wherein at least two cell layers are equipped with electrically conductive elements coupled with their electrodes, and there is at least one connection between the at least two cell layer obtained by means of at least one adhesive site realized from an electrically conductive adhesive on the contact elements.

BACKGROUND

Thanks to continuing development efforts, electric energy storage cells have become relevant for the use in, high-energy applications, for example as traction batteries in motor vehicles, or as stationary energy storage devices. It is known that such electric energy storage cells can be constructed from several cell layers, which is to say from individual electrochemical elements. In order to set an appropriate capacitance and/or output voltage, multiple cell layers are mutually connected to one another. The connections can in this case be realized as parallel connections or as connections in series of the individual cell layers. In order to realize this connection between the cell layers, it is expedient when the cell layers are provided with contact elements that are coupled in an electrically conductive manner with the positive or negative electrodes of the cell layer. The joining of these contact elements is often carried out by welding or soldering. However, it is also known that these connections can be produced with an electrically conductive adhesive. This results in an adhesive site connected the contact elements, usually designed as lead-off lugs. In particular when electric energy storage cells are used in motor vehicles, protection against short-circuits must be provided in order to rule out excessive heating of the electric storage cells, which can even lead to a fire in case of a failure that is caused by short-circuiting.

In this context it is known that the electric storage energy cells can be expanded by using a so called Current Interrupt Device (CID). These devices are intended to separate the electric energy storage cells from the external circuitry of the electric energy storage cell in case of an increased temperature that is causing a failure in the electric energy storage cell. Effective protection is thus achieved in this manner against external short-circuiting, which is to say the short-circuiting that is attributable to the external circuitry of the electric energy storage cells. However, such a CID is limited in its capability to prevent excessive development of heat resulting from an internal short-circuiting. Internal short-circuiting occurs when an individual cell layer is defective in such a way that the cell, layer itself creates an electrically conductive connection between its electrodes. A short-circuit is triggered in this manner in the cell layers connected in parallel because as a result of the defective cell layer, a current can flow between the other cell layers. A CID cannot provide an effective protection against such a failure. Moreover, a CID may not be used in various different designs of electric energy storage cells, such as for example pouch cells, due to their construction. Yet another type of proposed protection against heating that results from an internal short-circuit, which uses massive enclosures, cannot be used due to the high weight of such electric energy storage cells.

SUMMARY OF THE DISCLOSURE

The objective of the invention is therefore to solve this problem by providing an improved electric energy storage cell.

In order achieve this objective, an electric energy storage cell of the type mentioned in the introduction is provided, wherein the connection realized at least by means of the adhesive site is interrupted when a specific adhesive temperature limiting value is exceeded in the adhesive site.

The invention is based on the concept of achieving protection from external and internal short-circuits with a constructive modification of the connection between at least two cell layers. For this purpose, the adhesive site creating the connection is formed with an electrically conductive adhesive which has an adhesive-specific temperature limiting value, wherein the conductivity of the adhesive is lost if this limiting value is exceeded. In practice, this typically means a reduction of the electric conductivity by a factor of 1,000, wherein the connection created in the adhesive site can be regarded as interrupted within the context of the customary design according to the invention.

This solution is characterized in that no special structural components are required in order to realize this design, such as CID components. The protection from internal short-circuits is achieved so that when the connection in the adhesive site is interrupted, the defective cell layer itself is separated from the other cell layers. The heat development necessary in order to exceed the adhesive-specific temperature limiting value results from the fact that a high heat is developed in the contact element in the case of an internal short-circuit. After that, the current will flow for a short period of time to the other cell layer through the adhesive site, so that an additional heat component is created. If the adhesive-specific temperature limiting value is exceeded, a separation of the defective cell layer from one layer or from several layers will take place. As a result, no current can then flow through the defective cell layer and the thermal load on the electric energy storage cell, which is due to the short-circuiting, is terminated. In addition, the electric storage cell according to the invention also provides protection against external short circuits because a heat component comparable to the case of the failure described above is created also in case of a failure of the function of the circuitry of electric energy storage cells. Therefore, an effective protection of the energy storage cells against internal and external short-circuits is achieved, without causing in this manner significant increases of the weight of the electric storage cells.

It is advantageous when the adhesive-specific temperature limiting value is higher than the highest temperature that is customarily the maximum permissible operating temperature in the adhesive site. The conditions that are permissible for customary operations include in this case all the states of the electric energy storage cells in which the electric operations parameters, in particular the intensity of the current which the electric energy has been designed with the respective application, is not exceeded. At the same time, it is important to make sure that when a higher temperature has not been caused yet for a short period of time according to the design, a suitable inertial behavior of the electric energy storage cell can be selected. The selection of suitable limiting values for adhesives will be explained in more detail below.

It is expedient when an adhesive-specific temperature limiting value is selected in such way that this value is exceeded in the case of a failure that is due to a short-circuit of the electric energy storage cell, in particular as a result of an internal short-circuit of a cell layer. An important factor for selecting the adhesive-specific temperature limiting value is thus also the construction specific thermal load that is due to a short-circuit. The outer circuitry of the electric energy storage cell plays in this case a decisive role, which means that internal as well as external short-circuits indicative of such a failure should be selected empirically on the basis of the concrete application.

Overall, it is preferred when the adhesive comprises electrically conductive particles that form an electrically conductive network in a cured state of the adhesive, wherein the network is dissolved when the adhesive-specific temperature limiting value is exceeded. Typically, electrically conductive adhesives are designed so that the electrically conductive particles are comprised in a curable carrier substance. These electrically conductive particles are typically made of silver or copper, but there are also embodiments of particles that are made of gold, palladium, nickel, platinum or carbon. Suitable carrier substances are in particular resins, such as resins made of epoxy, polyimide, acrylate or polyester. The proportion of the electrically conductive particles in such a carrier substance is typically from 25 to 70 percent by weight, in particular 30 to 55 percent by weight. When the carrier substance is cured, an electrically conductive network is created between the electrically conductive particles, which is typically formed so that a reduction in the volume occurs during the transition of the adhesive to the cured state, which joins the particles to each other so that the conduction of the electric current is enabled. The nature of the adhesive is therefore such that this network will be dissolved when an adhesive-specific temperature limiting value is exceeded. Usually, suitable carrier substances are cured at temperatures ranging from 110° C. to 150° C., and they display temperature stability in a range from 150° C. to 180° C., in the case of special high-temperature adhesives up to 280° C. The adhesive-specific temperature limiting value thus should be selected beyond the above-mentioned ranges of temperature resistance. Typically, a temperature limiting value of 190° C. to 250° C., preferably between 195° C. and 210° C., can be considered. If the entire electric energy storage cell permits a fault-free operation at an even higher temperature, high-temperature adhesives can be employed, in particular those that are based on polyimide, which are resistant for a short period of time to temperatures of up to 400° C. In this manner, the embodiment variant thus offers the possibility to realize protection against short-circuits that is custom-made for the concrete application of the electric energy storage cell, which extends the application field to a broad range of battery technology parts.

In order to achieve an accelerated interruption of the connection between the cell layers, it can be advantageous when a propellant is included at least in the region of the adhesive, which is designed in such a way that when an adhesive-specific temperature limiting value is exceeded, it is expanded in the site of the adhesive so that the electric connection is interrupted. A characteristic of such propellants is that they expand their volume many times over above a certain temperature. This effect is used in this embodiment to drive the electrically conductive adhesive away from the contact elements when the expansion temperature is exceeded, in particular to dissolve in an accelerated manner the existing network of electrically conductive particles. In this respect, propellants comprising azodicarbamide are considered suitable, which can be designed for an expansion temperature between 100° C. and 250° C. The concrete design of the propellant is in this case in close interaction with the thermal stability of the used adhesive. It is conceivable that an adhesive-specific temperature limiting value results from the admixture of a propellant, which is far beyond the temperature stability of the carrier substance. However, it is also conceivable that the propellant can be allowed to expend already at lower temperatures, for example when it is known that the forces resulting from the expansion are more than sufficient to disperse the adhesive site.

In a preferred embodiment variant, an electric storage cell according to the invention is provided in such a way that the contact elements that are in contact with another are arranged in a stacked form. This arrangement, which is also known as a sandwich construction of contact elements to be connected, is suitable in particular for automated production processes and it thus enables a time-saving and cost-saving realization of the electric energy storage cells according to the invention.

It is also preferred when the electric storage cell is designed as a pouch cell. The invention provides advantages in particular in this case because pouch cells usually cannot be protected with a CID against short-circuits. Such pouch cells are typically provided with contact elements in the form of lead-out lugs, which are connected to one another with conventional connecting methods. The use of a conductive adhesive can therefore be easily integrated in the process for producing pouch cells.

It is conceivable that one adhesive site mutually connects two contact elements to one another. This connection of exactly two contact elements comprises in particular the realization of adhesive amounts applied in the form of points. This embodiment is particularly suitable in the case of stacked contact elements, wherein two adjacent contact elements are in each case connected with an adhesive point.

As an alternative, it is also conceivable when three or more contact elements are connected with at least one adhesive site. This embodiment in particular provides large-area and space-requiring connections for several contact elements with a larger amount of the adhesive. So for example, it is conceivable that even when contact elements are arranged in a stack-like manner, it is still possible not to connect the contact elements to one another as a whole, but to connect them instead in layers with a larger amount of electrically conductive adhesives.

In addition, according to another alternative embodiment of the invention, one or several adhesive sites are used to connect one or more contact elements to an electrically conductive body. Such a conductive body can be designed for example as a shunting strip made of copper or another suitable electrically conductive metal and it can be provided as an electrically conductive connection for a plurality of contact elements. Also in this case, the adhesive site can connect the contact elements in the form of points with the conductive body, or it can connect in one adhesive site a plurality of contact elements with the conductive body. These embodiments and both of the other embodiments mentioned above can be in general used in any combination in an electric storage cell. As a result, the invention is suitable for a wide variety of design forms of electric energy storage cells, which respectively require different joining mechanisms of the contact elements.

In addition, it is also possible to provide a design wherein one or more free end of several contact elements that are in contact with the adhesive site are designed to create a heat transfer section. This free end is typically an end portion of a contact element of the connection located opposite the electrode of the cell layer. In order to enable an improved heat input in the adhesive site, it proves advantageous when this free end is designed as a heat transfer section, which enables an improved heat input in the adhesive site with its geometry. In particular, such construction measures make it possible to control the the inertial behavior of the short-circuit. However, in addition to geometrical modifications, other possibilities for improved heat transfer are also conceivable, such as suitable surface processing methods.

These embodiments can be further developed in that the heat transfer section is designed in wavy, spiral, or zigzag form or helical shape. This embodiment is based on the principle that an accelerated heat input can be achieved with an enlarged contact surface between the heat transfer section and the adhesive site.

Alternatively, the heat transfer section can be also designed in such a way that it is provided with a larger base area when compared to the rests of the element. In this connection, it is particularly important to design the heat transfer section in the form of a small plate in order achieve the advantages mentioned above even without creating the bent shape of the free end.

In addition, the invention also relates to an electric energy storage device comprising at least an electric energy storage cell according to the invention. Further, the invention also relates to a motor vehicle that comprises at least an electric storage device according to the invention. All the embodiments relating to the electric energy storage cell can be applied analogously to the electric energy storage device and to the motor vehicle, so that the advantages mentioned above can be achieved also in the case of the device and of the motor vehicle.

BRIEF DESCRIPTION OF THE DRAWINGS

Other advantages and details of the invention will become evident from the described examples of the embodiments, as well as from the attached figures.

DETAILED DESCRIPTION

Figure 1:
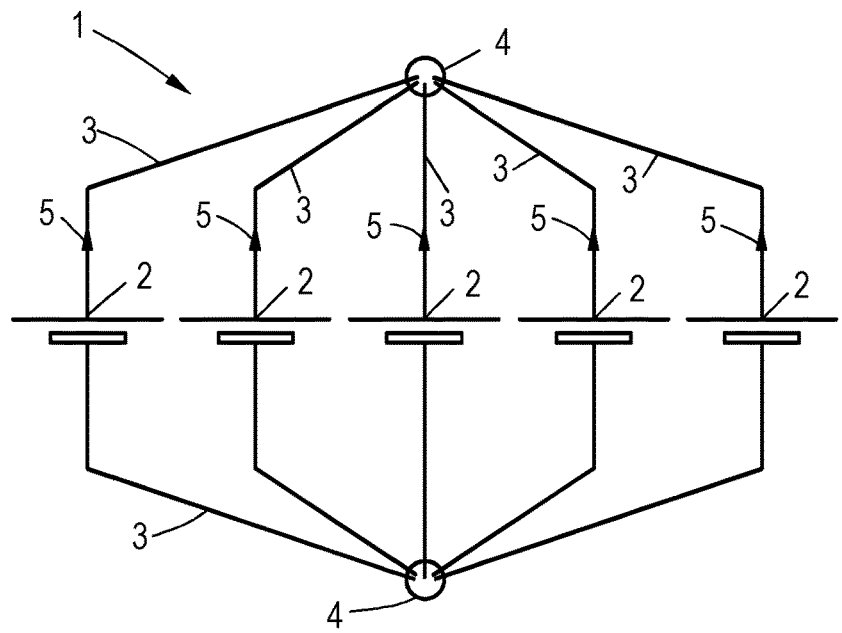
FIG. 1 through 3 outline drawings showing the principle of an electric energy storage cell in different operating states.
Figure 2:
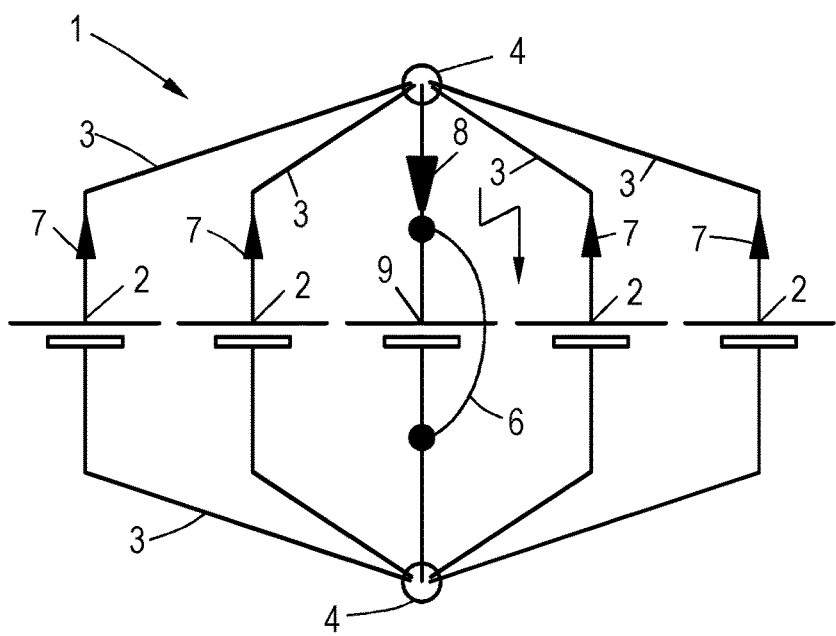
Figure 3:
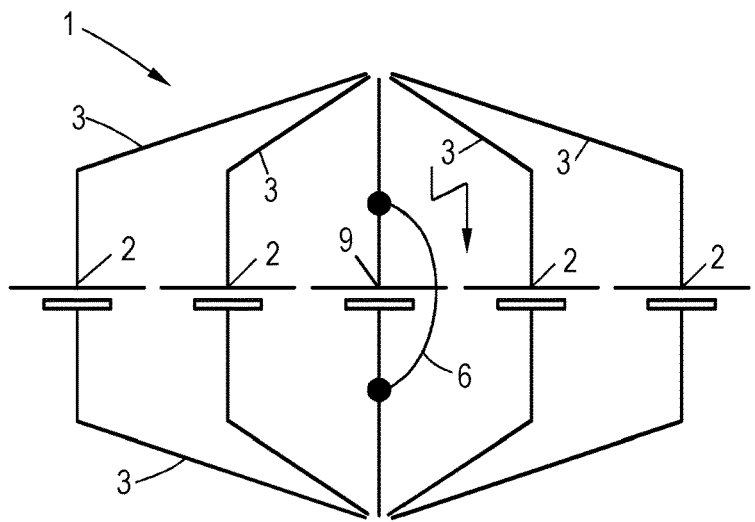

FIG. 1 through 3 show respective outline drawings showing an electric energy storage cell 1 that is provided with five cell layers 2. Each electrode of the cell layers 2 is in this case provided with a contact element 3. As shown in FIGS. 1 and 2, the contact elements 3 of each electrode run together in each case to an adhesive site 4, which is realized from an electrically conductive adhesive. In FIG. 1 is shown a fault-free, normal operational state, in which each cell layer 2 emits an operating current. If an internal short-circuit 6 is generated after this state in a defective cell layer 9, the state shown in FIG. 2 will be created. A higher heat input is thus caused in the adhesive site 4 by an internal short-circuit 6. In this state, the cell layers 2 also emit a short-circuit current 7, which is added to the summation current 9. The adhesive site 4 is designed in such way that an adhesive-specific temperature limiting value created for the adhesive is exceeded by the heat input. As shown in FIG. 3, in this case, the adhesive site 4, no longer shown in the figure, will at least interrupt the connection with the defective cell layer 9.

Figure 4:
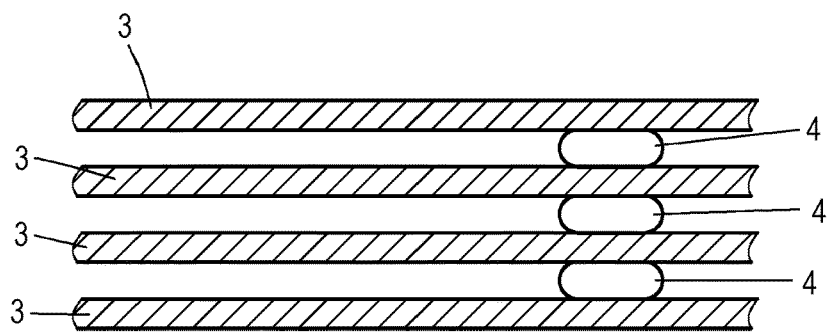
FIG. 4 through 6 outline drawings of differently designed embodiments showing the principle of connected contact elements.
Figure 5:
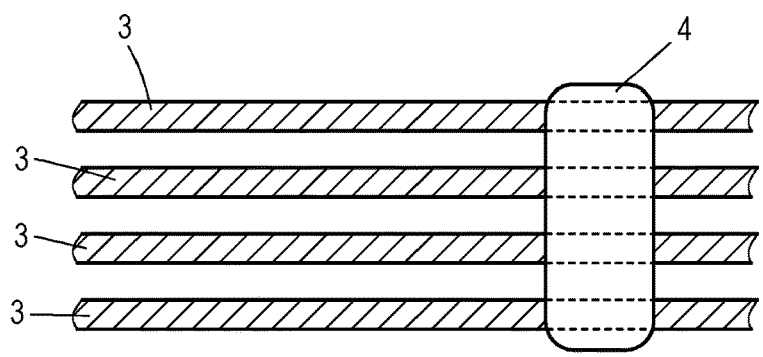
Figure 6:
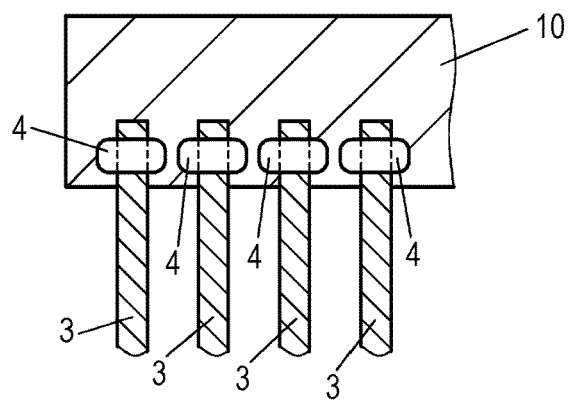

The FIGS. 4 through 6 are outline drawings respective showing the principle of four contact elements 3 connected by adhesive sites 4. In FIG. 4 is shown an embodiment in a longitudinal section, in which two respective elements 3 are connected by an adhesive 4 formed with a point shape. Another embodiment is shown in FIG. 5, in which the four contact elements 3 are connected with a single adhesive site 4. Finally, FIG. 6 shows a top view of a conductor body 10, in which four contact elements 3 are mutually connected by means of an adhesive site 4 in an electrically conductive manner. However, in this example it would be also conceivable to connect all contact elements 3 with a single adhesive site 4. The conductor body 10 is in this case formed from an electrically conductive metal such as copper.

Figure 7:
FIG. 7 through 11 contact elements having differently designed heat transfer sections.
Figure 8:
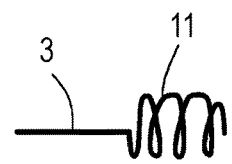
Figure 9:
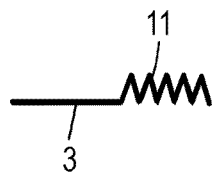
Figure 10:
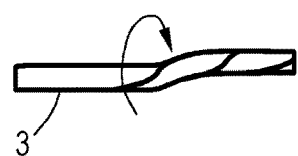
Figure 11:
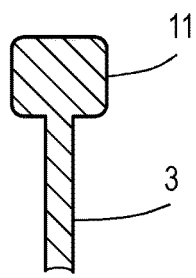

FIG. 7 through FIG. 11 show respectively a contact element 3 whose free ends are designed to create a heat transfer section 11, wherein FIG. 7 through 10 show lateral views and FIG. 11 shows a top view. In FIG. 7, the heat transfer section 11 is formed with a wavy shape in order to connect a larger surface with the adhesive. As shown in FIG. 8, the same aim is achieved with a helical embodiment of the same heat transfer section 11. FIG. 9 shows an embodiment of a heat transfer section that is similar to FIG. 9; wherein however, the heat transfer section 11 is formed in zigzag fashion. In addition, FIG. 10 shows a heat transfer section 11 wherein a helical configuration is created by rotating the longitudinal axis of the contact element 3. Finally, FIG. 11 shows a top view of a contact element 3 with a plate-like design of a heat transfer section 11 by means of which the base surface of the heat transfer section 11 is wider than that of the contact element 3. All of the embodiments illustrated in FIG. 7 through 11 enable improved transfer of heat in each adhesive site 4 when the heat transfer layers 11 are suitably arranged relative to each other and in the adhesive site 4.

Figure 12:
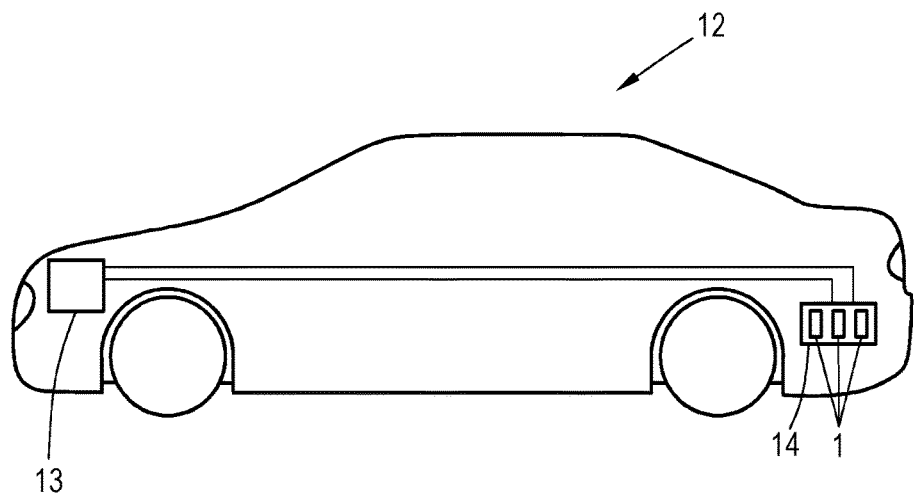
FIG. 12 an outline drawing of a motor vehicle according to the invention provided with an energy storage device according to the invention.

FIG. 12 finally shows an outline drawing explaining the principle of a motor vehicle 12 that is provided with an electric energy storage device 14 according to the invention. The motor vehicle is equipped with three energy storage cells 1 that can be in this case arranged for example in the rear region of the motor vehicle 12. A electro motor serves here as an energy source for an electromotive drive 13, which is in the present case indicated as being located in the engine compartment of the motor vehicle.

The invention claimed is:

1. An electric energy storage cell, comprising:
a plurality of cell layers, wherein at least two cell layers are provided with contact elements coupled with their electrodes in an electrically conductive manner, and at least one electric connection is realized between the at least two cell layers by means of at least one adhesive layer from an electrically conductive adhesive on the contact elements, wherein the at least one connection realized by means of the adhesive is interrupted when an adhesive-specific temperature limiting value is exceeded in the adhesive site, and
wherein a free end of one or several contact elements directly contacting an adhesive site is formed into a heat transfer section,
wherein the adhesive comprises electrically conductive particles that form an electrically conductive network in a cured state of the adhesive, wherein the network is dissolved when the adhesive-specific temperature limiting value is exceeded so that the at least one electric connection is physically separated, and wherein the adhesive comprises, at least in a region of the adhesive, a propellant, which is designed in such a manner that when the adhesive-specific temperature limiting value is exceeded, the adhesive site is expanded in such a manner that the at least one electric connection is physically separated.

2. The electric energy storage cell according to claim 1, wherein the adhesive-specific temperature limiting value is greater than a highest temperature of the adhesive permissible.

3. The electric energy storage cell according to claim 1, wherein the adhesive-specific temperature limiting value is selected in such a way that it is exceeded with a fault of the electric energy cell that is caused by a short-circuit.

4. The electric energy storage cell according to claim 1, wherein the contact elements are mutually in connection with one another in a stack-like form.

5. The electric energy storage cell according to claim 1, wherein the electric energy storage cell is a pouch cell.

6. The electric energy storage cell according to claim 1, wherein two or more contact elements are connected through at least one adhesive site.

7. The electric energy storage cell according to claim 1, wherein three or more contact elements are connected through at least one adhesive site.

8. The electric energy storage cell according to claim 1, wherein one or several contact elements are connected to an electrically conductive conductor body by means of at least one adhesive site.

9. The electric energy storage cell according to claim 1, wherein the heat transfer section is formed with a wavy, spiral, zigzag or helical shape.

10. The electric energy storage cell according to claim 1, wherein the heat transfer section is provided with a larger base surface area in comparison to the remaining part of the contact element.

* * * * *